July 2, 1940.   J. L. BARR   2,206,623
AUTOMOBILE PARKING DEVICE
Original Filed Aug. 20, 1932   3 Sheets-Sheet 1

Inventor
JOHN L. BARR
By Semmes & Semmes
Attorneys

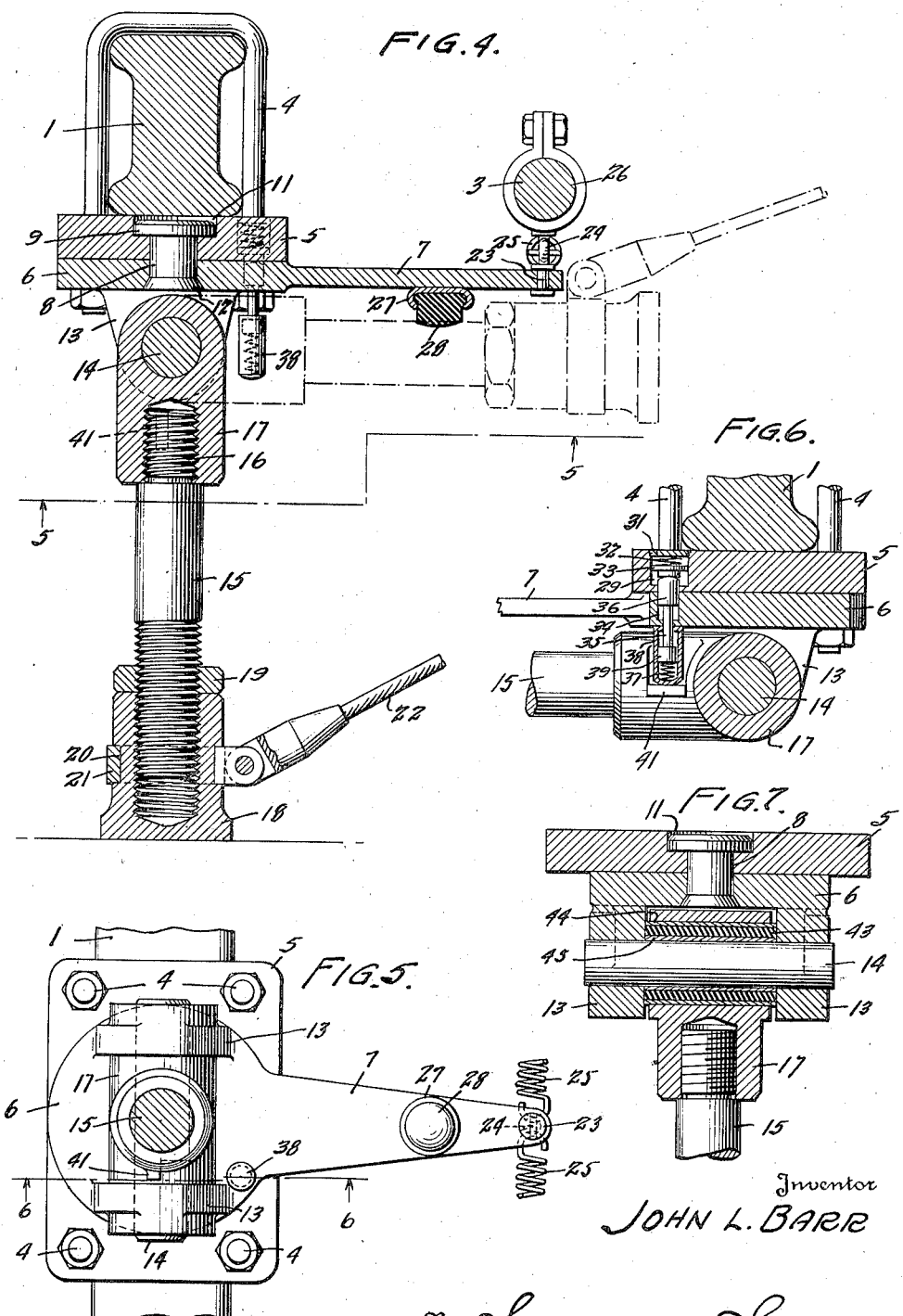

July 2, 1940.  J. L. BARR  2,206,623
AUTOMOBILE PARKING DEVICE
Original Filed Aug. 20, 1932   3 Sheets-Sheet 3
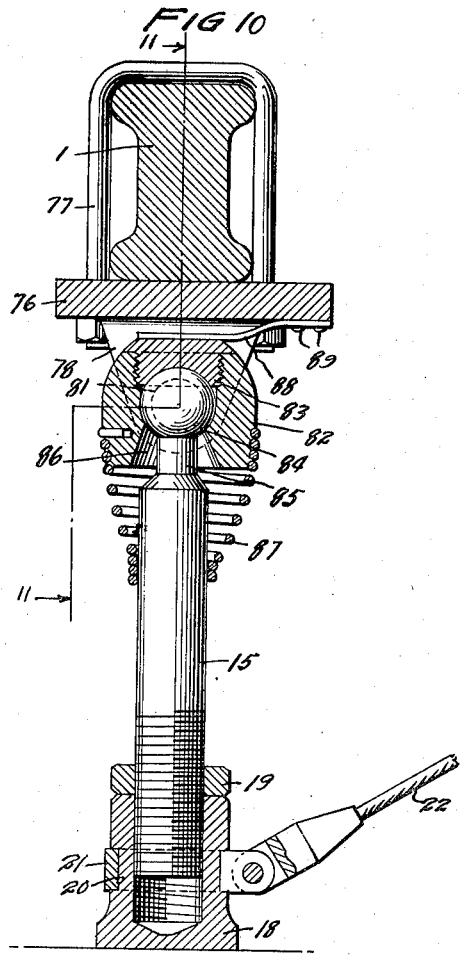

Patented July 2, 1940

2,206,623

UNITED STATES PATENT OFFICE 2,206,623

AUTOMOBILE PARKING DEVICE

John L. Barr, Chevy Chase, Md.

Original application August 20, 1932, Serial No. 629,691. Divided and this application April 13, 1936, Serial No. 74,171

12 Claims. (Cl. 280—150)

This application is a division of my copending application Serial No. 629,691, filed August 20, 1932, now Patent #2,086,459, dated July 6, 1937.

An object of this invention is to minimize the danger of injury both to the elevating device and to the roadbed through twisting strains which may be imposed upon the device due to inequalities in the roadbed, cramp of the steering wheels and other like factors.

Another object of my invention is to provide a simple construction that is easily and cheaply made and will always be available for instant operation when it is necessary to turn the car on a short radius.

A still further object of my invention is to provide a device which will permit turning of the car on a short radius with a minimum of effort, and yet which has no harmful effect on the normal steering of the vehicle when the device itself is not in operation.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

Figure 4 is a view partly in cross section of the details of construction of my elevating device, showing in dotted lines the device raised to the inoperative position.

Figure 5 is a view taken on the line 5—5 of Figure 4, looking in the direction of the arrows.

Figure 6 is a view taken on the line 6—6 of Figure 5, looking in the direction of the arrows.

Figure 7 is a cross sectional view of a modification of the joint between the elevating device and the car.

Figure 10 is a side elevation partly in cross section of another modification of my device.

Figure 11 is a view taken on the line 11—11 of Figure 10, looking in the direction of the arrows.

Figure 12 is a detail partly in cross section of a modification of a mounting for the type of device disclosed in Figure 10.

Figure 13 is a detail view of a modification showing the attachment of the elevating member to an automobile.

Figure 14 is a view taken along the line 14—14 of Figure 13, looking in the direction of the arrows.

Figure 1:
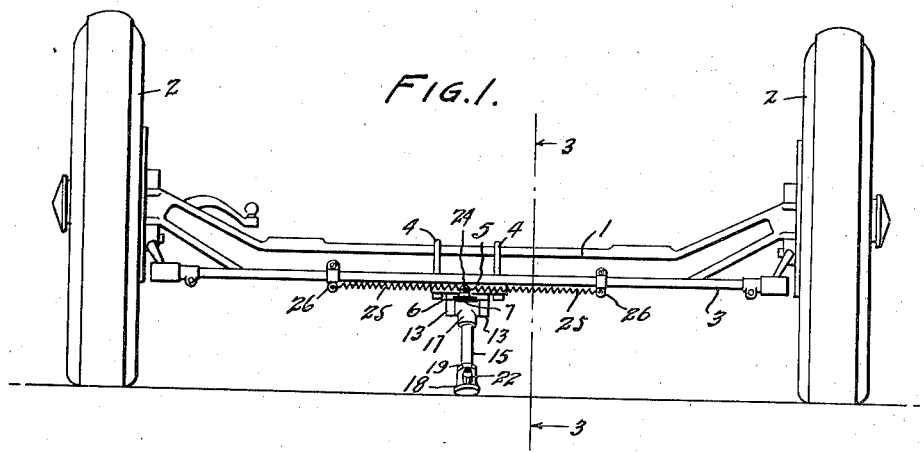
Figure 1 is an elevation, looking from the rear of the car towards the front, of the front steering wheels of the car with my elevating device attached in place.

Referring to the drawings, and particularly to the form of my device shown in Figures 1 to 6 inclusive, I have shown a steering axle of an automobile, which is normally the front axle, designated by the numeral 1. Mounted on this front axle are steering wheels 2, shown in a cramped position in dotted lines in Figure 2. In order to steer the wheels, proper connections such as are usual in constructions of this character are made, which include a steering tie rod 3.

Fastened by suitable U-clamps 4 to the under side of the front axle is an elevating mechanism comprising a support plate 5, which acts as one-half of a swivel joint, the other half of which is a swivel plate 6 having an arm 7 integrally formed therewith. The support plate 5 and the swivel plate 6, which is in sliding contact therewith, are mounted so that the plate 6 can swivel on the plate 5.

There is a stud 8, as plainly shown in Figure 4, whose upper end is provided with a head 9 which fits in the recess 11 of the support plate 5. The lower end of the stud 8 may be provided with a flanged portion 12 which is suitably attached by any known means to the stud 8, and which permits the swivel plate 6 to rotate on the support plate 5. The swivel plate 6 is provided with two downwardly extending trunnion blocks 13 which hold the ends of a stub axle 14.

Mounted to swing on the stub axle 14 is an elevating rod 15 which is screwed, at 16, into a bearing member 17 which swivels on the stub axle 14. At the lower end of the elevating rod 15 I have provided a foot construction comprising a foot member 18 into which is screwed the rod 15. A lock nut 19 is then screwed into position to hold the rod 15 in the foot member 18 at the desired position. This construction permits the rod 15 to have any desired operative length to accommodate for various sizes of cars.

The foot member 18 is made with an annular recess 20 around which is bolted a collar 21 to which is attached, by suitable connections, a cable 22 so that upon pulling the cable the elevating rod 15 and the accompanying mechanism may be drawn up into the position shown in dotted lines in Figure 4.

The rod 15 may be, in operation, let down, and may swing on either side of the vertical. The driver, for instance in the position shown in Figure 3, drives the car forward to raise the front end sufficiently to relieve the weight on the front wheels to permit them to be readily turned. If the elevating rod 15, however, was on the other side of the vertical, he would back the car on to the rod so that the wheels could be readily turned. This general form of operation is shown in my Patents Nos. 1,967,219, 1,954,308, Re. 19,247, 1,963,879, and 1,969,198. It gives a flexibility of operation not inherent in the other devices. There is no danger of injuring the elevating rod because there is no stop against which the momentum of the car can deal a damaging impact. The device is merely allowed to fall into engagement with the roadbed, and if the driver fails to mount upon the device at the exact position he wants, and should drive over it, for instance by backing the car, he can come forward a few inches and mount it again. It will be understood that the control is applied through the power of the car and through the control of the foot brakes. It is an easy operation to drive up on the device and hold the car by means of the brakes in the desired position while the front wheels are turned. All this has been explained in my applications which issued into the patents listed above.

In the construction shown in the drawings, the arm 7 is provided near its end with a support piece 23 carrying an upstanding eyelet member 24 to which are attached springs 25, the springs 25 at their other ends being attached to support pieces 26 mounted on the steering tie rod 3.

The arrangement is such that through the arm 7 and the spring connections with the tie rod, the elevating rod 15 is swiveled on the swivel joint comprising the support plate 5 and swivel plate 6, so that when the rod 15 swings either forward or to the rear of the vertical on the stub axle 14, the plane of swing of the member 15 will be substantially in line with a plane passing through the wheels. This is plainly shown in Figure 2, which shows the wheels cramped and the rod 7 in dotted lines having been carried to one side. The plane of swing of the rod 15 will be substantially parallel to the cramped position of the wheels.

In order to permit the device to be held in its upper inoperative position, as shown in Figure 4, without danger of rattling or of injuring the device, or the car structure, I have shown on the bottom of the arm 7 a holding clamp 27 on which is mounted a rubber bumper 28 against which the rod 15 rests when the cable 22 has hauled it into its uppermost position.

In order to hold the mechanism in its inoperative position from swinging each time the steering wheels are moved, I have shown the support plate 5 provided with a recess 29 having a suitable cap 31 screwed therein. In the recess is mounted a spring 32 carrying a spring pressed plate 33. There is provided in the swivel plate 6 a recess 34 in which is mounted a plunger 35 having a head 36 which, in the position of the parts shown in Figure 6, passes through the apertures in the swivel plate 6 and support plate 5, locking the two so that the swivel plate 6 cannot rotate or swivel on the support plate 5. Urging the plunger 35 into its upper position is a spring 37 mounted in a support piece 38. The plunger 35 is provided at its lower end with a head 39 against which the spring 37 bears.

In the position shown in Figure 6, the head 36 of the plunger 35 locks the swivel plate 6 from rotation, and the plunger 35 is held in spring pressed relation between the tension springs 32 and 37. Upon lowering the elevating rod 15 by releasing the cable 22, a contact lug 41, which has been bearing against the head 39, falls with the rod 15 and no longer pushes against the head 39. The head 39 then falls and the spring 32 pushes the head 36 of the plunger 35 to the lower position, so that the head 36 no longer locks the swivel plate 6 from rotation.

Figure 2:
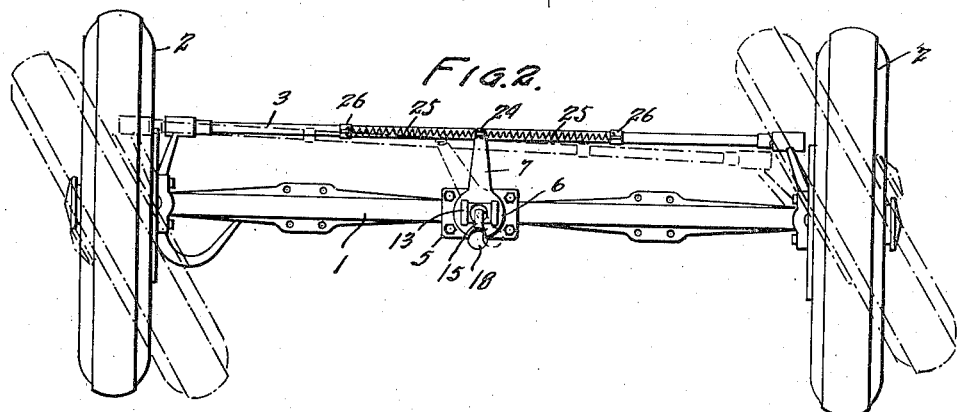
Figure 2 is a bottom plan view of the construction shown in Figure 1, with part of the details omitted.

Now, let us assume that the rod 15 has again been raised into the position shown in Figure 6, but that the cramp of the wheels prevents the head 36 from entering in the aperture in the plate 5. In such a case no harm is done, because the spring 37 is merely compressed and the head 36 will enter the aperture in the plate 5 when the rod 7 is in a position such as is shown in Figure 2 in the full line position.

This construction permits the device to be held in position to prevent its constant swivelling when not in use, and yet it is free to swivel immediately upon lowering the elevating rod 15. By reason of the fact that the connection between the rod 7 and the tie rod 3 is through springs 25, the normal steering of the vehicle when the parts are in the position shown in Figure 6 can proceed without undue interference. The spring connection between the rod 7 and the rod 3 is also of advantage in view of changes in the angular position of the rod 3 during cramping of the wheels—for instance, such an advantage as is depicted in dotted lines in Figure 2.

In Figure 7 I have shown a modification in which the bearing member 17 is shown mounted in the shaft 14 through a rubber or elastic bushing member 42, comprising a rubber ring 43 and bushings 44 and 45. This construction permits rocking of the elevating rod 15 on the shaft 14 to take care of some of the strains imposed while moving the car either into forward or back position while the wheels are cramped. Means, of course, have been shown in the other forms of device for swivelling the rod 15 so that its plane of rotation on the stub axle 14 coincides substantially with the cramp of the steering wheels. Since there is a slight arcuate motion to the front of the car when the device is used while the steering wheels are cramped, under some conditions of operation I prefer to permit a slight rocking of the elevating rod 15 on the stub axle 14, and the form shown in Figure 7 will take care of this limited motion just described. The above described construction will compensate for twisting and shearing forces imparted to the elevating rod 15 by movement of the car. Under certain conditions of operation, it is not necessary to employ the form of device shown in Figure 7, but it has certain inherent advantages.

Figures 3, 8:
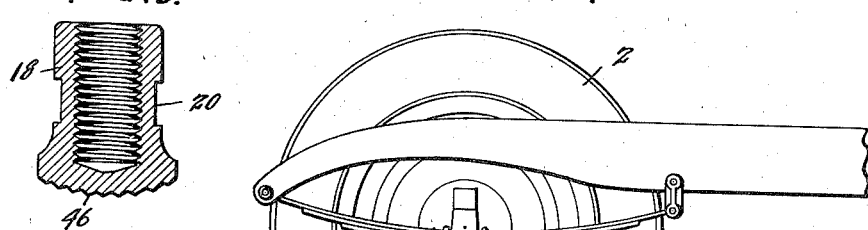
Figure 3 is a view taken on the line 3—3 of Figure 1, looking in the direction of the arrows.
Figure 8 is a detail in cross section of a modified form of ground engaging member for the elevating device.

In Figure 8 I have shown a modification of the foot member 18 wherein the ground engaging portion is rounded and provided with serrations 46 which may be of any desired configuration.

Figure 9:
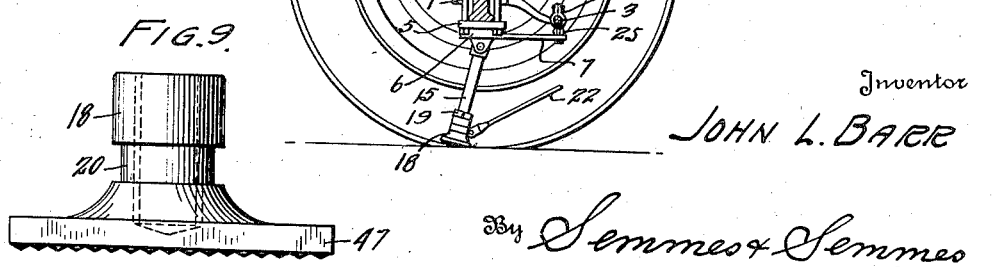
Figure 9 is a front elevation of a modified form of ground engaging device for the elevating member.

In Figure 9 is shown a still further modification, in which the ground engaging extremity of the foot member 18 presents an enlarged flat surface, as shown at 47, and is provided with a serrated or roughened surface.

Another type of device is shown in Figures 10 to 14, inclusive. In this construction there is a base plate 76 held on the front axle by suitable straps 77. The base plate 76 is provided with downwardly projecting split trunnion blocks 78 which are held together by screws 79, and in which are mounted trunnions 81. The trunnions support a socket arrangement 82 with a removable cap 83, flattened at its upper surface.

Mounted in the socket arrangement 82 is a ball 84 which is mounted on a rod 85, adapted to be screw threaded into the elevating leg 15 at the top. The rod 85 is inserted in the aperture of the socket member and the cap 83 screwed thereon to hold the ball in place, thus giving a firm ball and socket arrangement. There is a conical aperture 86 in the bottom of the socket member 83 permitting limited universal movement between the ball and socket, allowing the leg 15 to swing with a universal action. The ground engaging construction is similar to that shown in Figure 1.

Surrounding the socket member 82 is a guiding spring 87, the other end of which surrounds and engages the elevating leg 15. This spring tends at all times to retain the elevating leg in its vertical position while the parts are in the position shown in Figure 10, and will tend to keep the leg 15, when the socket 82 is moved, in the same relation to the socket as is depicted in the views, Figures 10 and 11.

In the position shown in Figure 10, a spring member 88 bears against the flattened upper surface of the cap 83. The spring member 88 is attached at 89 to the base 76. By reason of the fact that this spring member 88 exerts a downward force and tends to lie flat against the flattened upper surface of the cap 83, the socket member 82 is urged to maintain the position shown in Figure 10. In this position the spring 87 tends to hold the elevating leg 15 in the perpendicular position. By pulling on cable 22 the elevating leg can be raised from the operative into the inoperative position.

When the leg is in the downward position, in moving the car either forward or backward, depending upon the position of the ground engaging or foot member 18, the front wheels are elevated by the elevating leg 15. By reason of the fact that in normal operation not all of the weight is taken off of the steering wheels, the frictional engagement of the steering wheels with the ground will prevent collapse of the elevating leg in a direction transverse to the longitudinal axis of the car, which would normally occur were all of the weight taken off the front wheels.

In Figure 12 is shown a form of the device in which the socket member 82 is provided with a deep recess 91 in which is mounted an elastic member, such as rubber, 92, which surrounds the rod 85 and tends to hold it in the vertical position, thus holding the elevating leg 15 in that position. The structure in this case is somewhat different from that shown in Figures 10 and 11. There is no removable cap in the form shown in Figure 12, but there is an annular holding ring 93 which holds the plate 84 in its position in the socket member 82.

In Figures 13 and 14, instead of using a ball and socket arrangement I have shown the trunnion block 78 supporting a trunnion 94 of somewhat greater length than the trunnion 81 of the form shown in Figures 10 and 11. Mounted on the trunnion 94 is an elongated cylindrical spider 95, having a flattened top 96 and a flattened bottom 97. Two springs 98 and 99 bear against the flattened top 96 and tend to hold the member 95 in the position shown in Figures 22 and 23.

The member 95 is provided with stub shafts 101 on which is journaled a yoke piece 102, which may be integrally formed with the elevating leg 15. Springs 103 press against either side of flattened surfaces 104 of the yoke piece 102, and tend to hold the elevating leg 15 in the position shown in Figure 22.

The operation of this construction is similar to that described in connection with Figures 10 and 11, as well as Figure 12. The springs 98 and 99 and the springs 103 tend to hold the elevating leg 15 in the position shown in the drawings. By reason of the frictional engagement of the front wheels, when cramped, with the road, even in their so-called elevated position, collapse of the elevating leg 15 in a direction transverse to the longitudinal axis of the car will not normally occur, and the device may be used to elevate the wheels by driving either to the front or to the back, depending upon the position of the ground engaging portion of the elevating leg.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A device to relieve at least part of the weight on the steering wheels of a vehicle comprising a single leg upon which the vehicle is adapted to be driven, a pivot upon which the leg is pivoted to the vehicle, and means cooperating with the pivot for the single leg to compensate for twisting and shearing forces.

2. A device to relieve at least part of the weight on the steering wheels of a vehicle comprising a single leg pivoted to the vehicle upon which the vehicle is adapted to be driven by either forward or backward movement of the vehicle, a pivot for the single leg, and means cooperating with the pivot for the single leg to compensate for shearing and twisting forces.

3. A device to relieve at least part of the weight on the steering wheels of a vehicle comprising a single leg upon which the vehicle is adapted to be driven, pivot means upon which the leg is pivoted to the vehicle, means to compensate for twisting forces, and means to center the leg.

4. A device to relieve at least part of the weight on the steering wheels of a vehicle comprising a single leg upon which the vehicle is adapted to be driven, pivot means upon which the leg is pivoted to the vehicle, means to compensate for twisting forces, and spring means tending to center the leg laterally with respect to the longitudinal axis of the vehicle.

5. A device to relieve at least part of the weight on the steering wheels of a vehicle comprising a single leg pivoted to the vehicle upon which the vehicle is adapted to be driven, means to compensate for shearing forces and spring means tending to center the leg laterally with respect to the longitudinal axis of the vehicle.

6. A device to relieve at least part of the weight on the steering wheels of a vehicle comprising a single leg pivoted to the vehicle upon which the vehicle is adapted to be driven by either forward or backward movement of the vehicle, means to compensate for both shearing and twisting forces, and spring means tending to center the leg laterally with respect to the longitudinal axis of the vehicle.

7. A device to relieve at least part of the weight on the steering wheels of a vehicle comprising elevating means adapted to swing on both sides of the vertical to raise the vehicle by forward or backward movement of the vehicle, depending on which side of the vertical the elevating means is in engagement with the roadbed, a joint on which the elevating means swings, a swivel joint between the first named joint and the vehicle, and a rubber bushing in said first named joint to permit the elevating means to rock thereon.

8. A device for relieving the weight on the tires of a vehicle to allow free turning of the steering wheels in parking, comprising a single support leg, universally mounted on the front axle of the vehicle, adjustable in length, for elevation of the axle to relieve the weight on one or both steering wheels, said universal pivot being to permit movements of the leg to compensate for forces set up in using the device when the steering wheels are cramped.

9. A device of the character described comprising a vehicle, steering wheels therefor, a compression element universally pivoted on the vehicle and free to take positions imparted to it when the vehicle is driven onto the element while the steering wheels are cramped, and spring means tending to center the compression element.

10. A device of the character described comprising a vehicle, a compression element, a universal pivot for the element on the vehicle permitting the element to absorb motions imparted by twisting strains, and a resilient centering means for the compression element.

11. A device of the character described comprising a vehicle, a compression element, a universal pivot for the element on the vehicle whereby the element is free to take positions imparted to it when the vehicle is driven thereon while the steering wheels are cramped, and resilient means opposing tension to movement in at least one direction.

12. A device to relieve at least part of the weight on the steering wheels of a vehicle comprising elevating means adapted to swing on both sides of the vertical, depending on which side of the vertical the elevating means is in engagement with the roadbed, a pivot for the elevating means, a swivel joint between the pivot and the vehicle, and a rubber bushing in said pivot to permit the elevating means to rock thereon.

JOHN L. BARR.